United States Patent
Tremolada et al.

(10) Patent No.: US 12,391,233 B2
(45) Date of Patent: Aug. 19, 2025

(54) AGRICULTURAL VEHICLE WITH A MANAGEMENT AND COMMAND SYSTEM OF A CONTINUOUSLY VARIABLE TRANSMISSION GROUP

(71) Applicant: SAME DEUTZ-FAHR ITALIA S.P.A., Treviglio (IT)

(72) Inventors: Simone Tremolada, Treviglio (IT); Mario Gatti, Treviglio (IT)

(73) Assignee: SAME DEUTZ-FAHR ITALIA S.P.A., Treviglio (IT)

( * ) Notice: Subject to any disclaimer, the term of this patent is extended or adjusted under 35 U.S.C. 154(b) by 0 days.

(21) Appl. No.: 18/704,768

(22) PCT Filed: Nov. 11, 2022

(86) PCT No.: PCT/IB2022/060867
§ 371 (c)(1),
(2) Date: Apr. 25, 2024

(87) PCT Pub. No.: WO2023/099993
PCT Pub. Date: Jun. 8, 2023

(65) Prior Publication Data
US 2025/0001997 A1    Jan. 2, 2025

(30) Foreign Application Priority Data

Dec. 2, 2021   (IT) ......................... 102021000030551

(51) Int. Cl.
*B60W 10/101*    (2012.01)
*F16H 61/66*    (2006.01)

(52) U.S. Cl.
CPC ..... *B60W 10/101* (2013.01); *B60W 2300/152* (2013.01); *B60W 2510/0638* (2013.01);
(Continued)

(58) Field of Classification Search
CPC ............. F16H 59/06; F16H 2059/6846; F16H 2059/6861; F16H 2059/704;
(Continued)

(56) References Cited

U.S. PATENT DOCUMENTS 6,821,228 B2    11/2004   Aoki et al.
8,380,405 B2 *   2/2013   Matsuda ............. F02N 11/0833
                                                  477/37
(Continued)

FOREIGN PATENT DOCUMENTS

DE    102011017748 A1 * 10/2012   ........... F16H 61/462
JP        6263861 B2     1/2018

OTHER PUBLICATIONS

English translation of DE102011017748A1; http://translationportal.epo.org; Dec. 4, 2024 (Year: 2024).*
(Continued)

*Primary Examiner* — Roger L Pang
(74) *Attorney, Agent, or Firm* — Armstrong Teasdale LLP

(57) ABSTRACT

An agricultural vehicle has wheel groups, an engine group, a continuously variable transmission group connecting the engine group to the wheel groups and having a hydraulic device, user management elements for driving the agricultural vehicle and setting motion modes thereof, and vehicle management elements for detecting operating conditions of the agricultural vehicle by detecting speed of the agricultural vehicle, engine revolutions, gear ratio and hydraulic pressure value of the continuously variable transmission group. A management and command system, operatively connected to the user management elements, the vehicle management elements, the engine group and the continuously variable transmission group, commands the continuously variable transmission group in at least one driving operating configuration, in which a hydraulic action of the hydraulic device is commanded according to predefined steps, and at
(Continued)

least one auxiliary operating configuration in which the hydraulic action of the hydraulic device is commanded according to a continuous course over time.

13 Claims, 4 Drawing Sheets

(52) U.S. Cl.
CPC ............... *B60W 2510/1005* (2013.01); *B60W 2510/1075* (2013.01); *B60W 2520/10* (2013.01); *B60W 2710/0666* (2013.01); *B60W 2710/1005* (2013.01); *F16H 2061/6615* (2013.01)

(58) Field of Classification Search
CPC .......... F16H 2059/366; B60W 10/101; B60W 2300/152; B60W 10/103; B60W 10/107; B60W 2510/0638; B60W 2510/1005; B60W 2510/1075; B60W 2510/108; B60W 2520/10; B60W 2710/1005
USPC ............... 701/51; 477/38, 43, 44, 45, 52, 68
See application file for complete search history.

(56) References Cited

U.S. PATENT DOCUMENTS

| | | | |
|---|---|---|---|
| 8,554,427 B2* | 10/2013 | Yasunaga | F16H 61/66259 701/87 |
| 11,535,229 B2* | 12/2022 | Lee | F16H 59/18 |
| 2015/0198247 A1 | 7/2015 | Yahagi et al. | |

OTHER PUBLICATIONS

International Search Report for International Patent Application No. PCT/IB2022/060867, mailed Jan. 19, 2023.

* cited by examiner

AGRICULTURAL VEHICLE WITH A MANAGEMENT AND COMMAND SYSTEM OF A CONTINUOUSLY VARIABLE TRANSMISSION GROUP

CROSS-REFERENCE TO RELATED APPLICATIONS

This application is a National Phase Application of PCT International Application No. PCT/IB2022/060867, having an International Filing Date of Nov. 11, 2022, which claims priority to Italian Application No. 102021000030551, filed Dec. 2, 2021, each of which is hereby incorporated by reference in its entirety.

FIELD OF THE INVENTION

The object of this invention is a vehicle for agricultural use, preferably in the embodiment wherein the vehicle for agricultural use is a "tractor." Furthermore, the object of the present invention is a method of managing and commanding a continuously variable transmission group of an agricultural vehicle.

In the following description, the periphrases "vehicle for agricultural use" refers both to agricultural tractors and, more generally, to earthmoving machines derived from agricultural tractors. The term "tractor" refers to vehicles of large dimensions that are generally specific for the execution of power actions in the agricultural sector.

The periphrases "wheel group" refers to all types of wheels, without any limitation to the type of tire and rim, of the single or twin type.

The periphrases "engine group" refers to one or more components suitable for suppling engine power. "Engine group" is not limited to a particular type of power supply, internal combustion or electrically driven or hybrid driven.

BACKGROUND OF THE INVENTION

In the known solutions for vehicles for agricultural use, drive action produced by the engine is exploited to move the vehicle by being transmitted to the wheel groups. In particular, the transmission of the engine group action to the wheel groups is commanded and performed by a "transmission group" positioned along the kinematic chain that joins the "engine group" and the "wheel groups."

Depending on the embodiments of the "transmission group", the vehicle has a different behavior, giving rise to different driving sensations for the user.

For example, in vehicle solutions comprising a mechanical transmission group, the variation of the gear ratio, and therefore the gear variation, takes place according to a step, that is it takes place in steps, where each step corresponds to a specific gear ratio. In driving such vehicles, therefore, to a change in the gear ratio, the user perceives a jerk or a step.

On the other hand, for example in vehicle solutions comprising a continuously variable transmission group, the variation of the gear ratio, and therefore the gear variation, takes place in a continuous or stepless mode. In driving such vehicles, therefore, the variation of the gear ratio is performed continuously over time and the user perceives said change as constant over time, not receiving jerks or steps.

However, the solutions with mechanical transmission groups which are particularly suitable, as well as desirable in terms of feeling by the users, for the driving conditions of the vehicle, turn out to be complex to manage in the auxiliary operating conditions. In particular, the periphrases "auxiliary operating conditions" refers to a series of specific driving modes such as the "eco" mode, the "super creeper" mode, the "starting" mode, the "starting and park" mode, the "reversing" mode, or "parking-with-gear-engaged" mode, in which the vehicle is such that it performs certain movements and motions under specific and desired conditions.

SUMMARY OF THE INVENTION

The object of the present invention is to implement an agricultural vehicle in which the user in driving operating conditions perceives the typical conditions and sensations of the jerks and steps of mechanical transmission groups and in which the user is able to perform with controlled modes all the desired auxiliary operating conditions. This object is achieved by an agricultural vehicle as described and claimed herein.

Further, the same object is achieved by a method of managing and commanding a continuously variable transmission group for an agricultural vehicle as described and claimed herein.

Preferred embodiments of the present invention are also described.

BRIEF DESCRIPTION OF THE DRAWINGS

The features and advantages of the vehicle for agricultural use according to the present invention will be apparent from the following description, made by way of non-limiting example according to the attached figures, wherein.

DETAILED DESCRIPTION

Figure 1A:
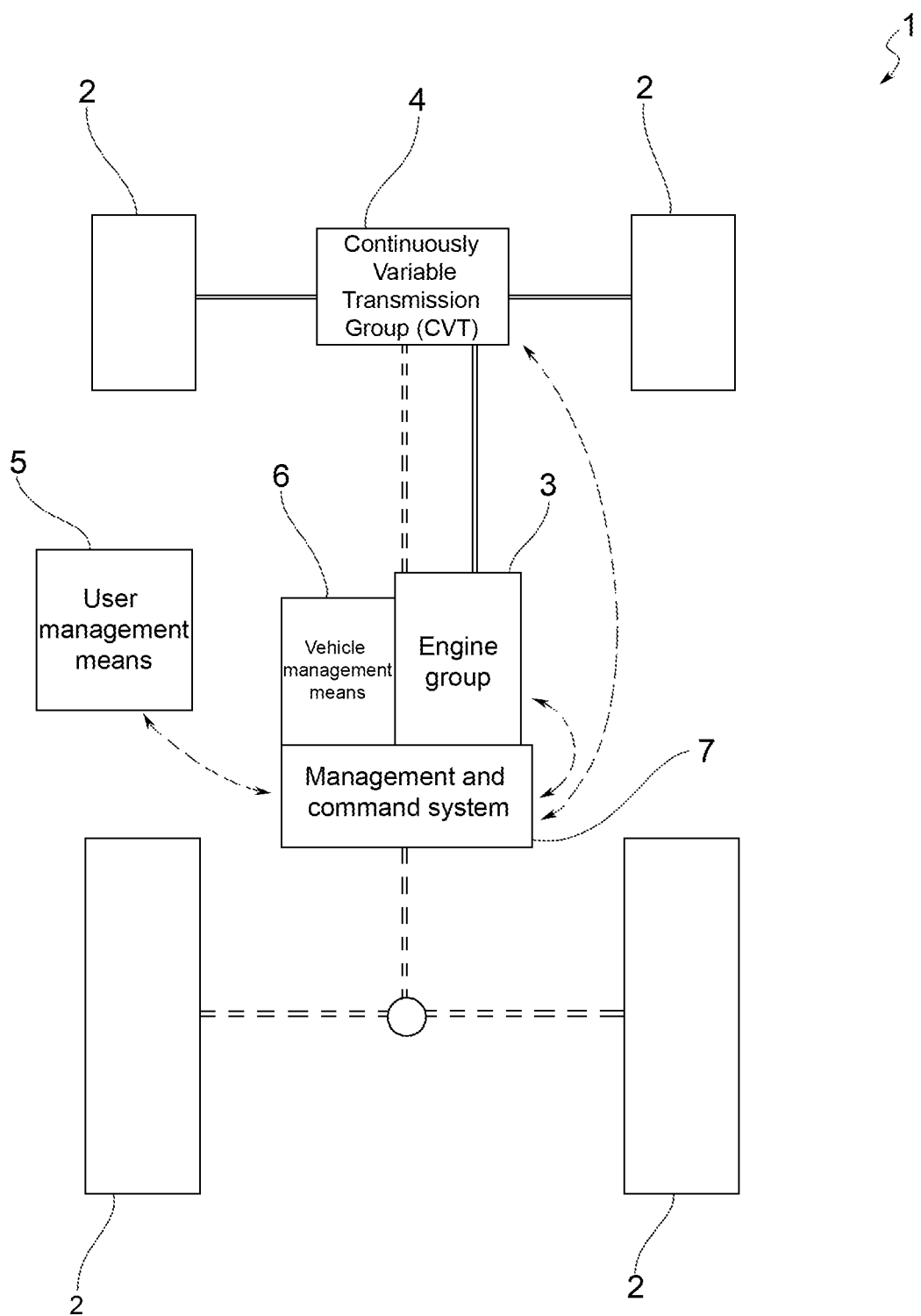
FIG. 1a shows a schematization of a vehicle for agricultural use according to the present invention.
Figure 1B:
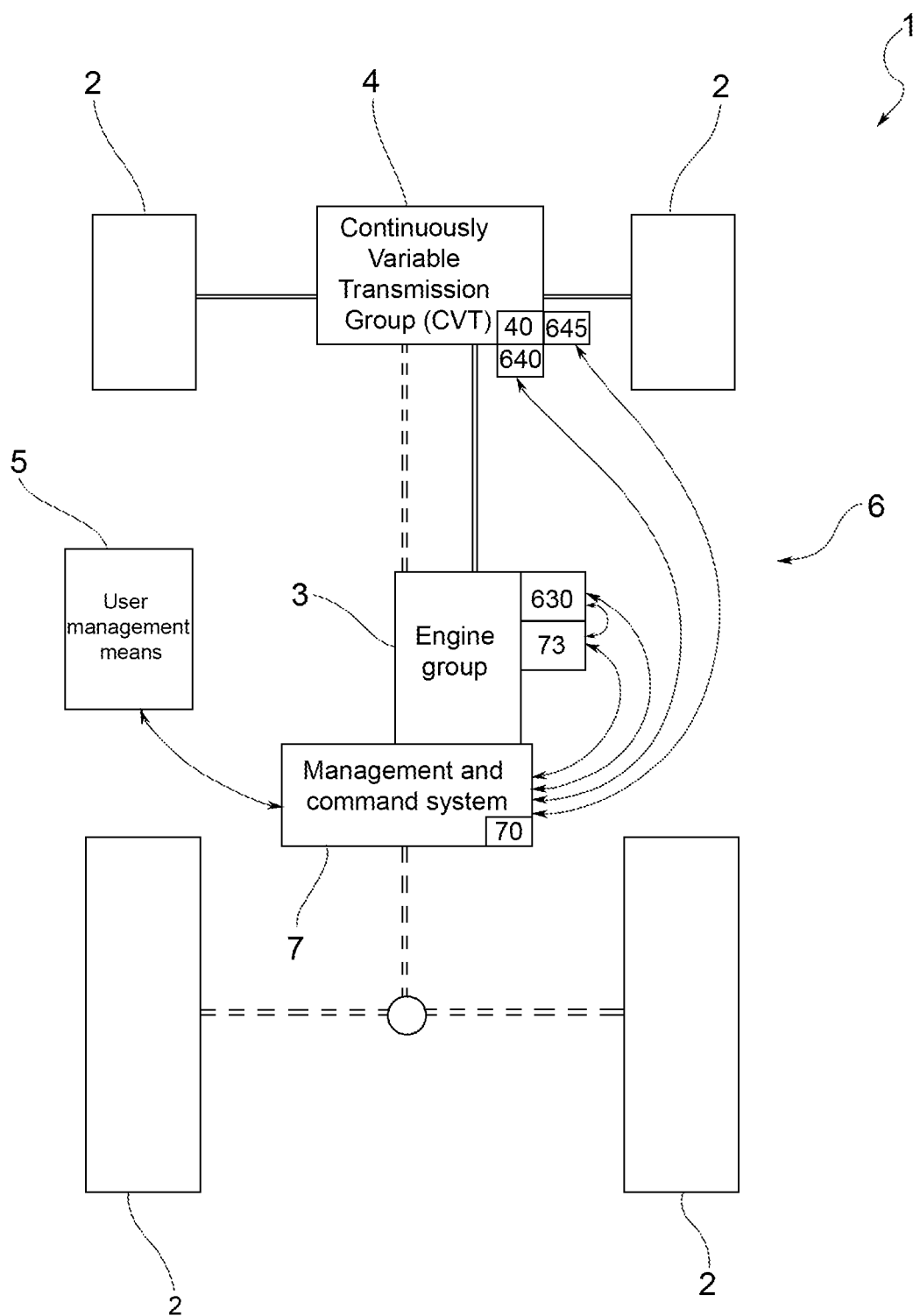
FIG. 1b shows another schematization in greater detail of a vehicle for agricultural use according to the present invention.
Figure 2:
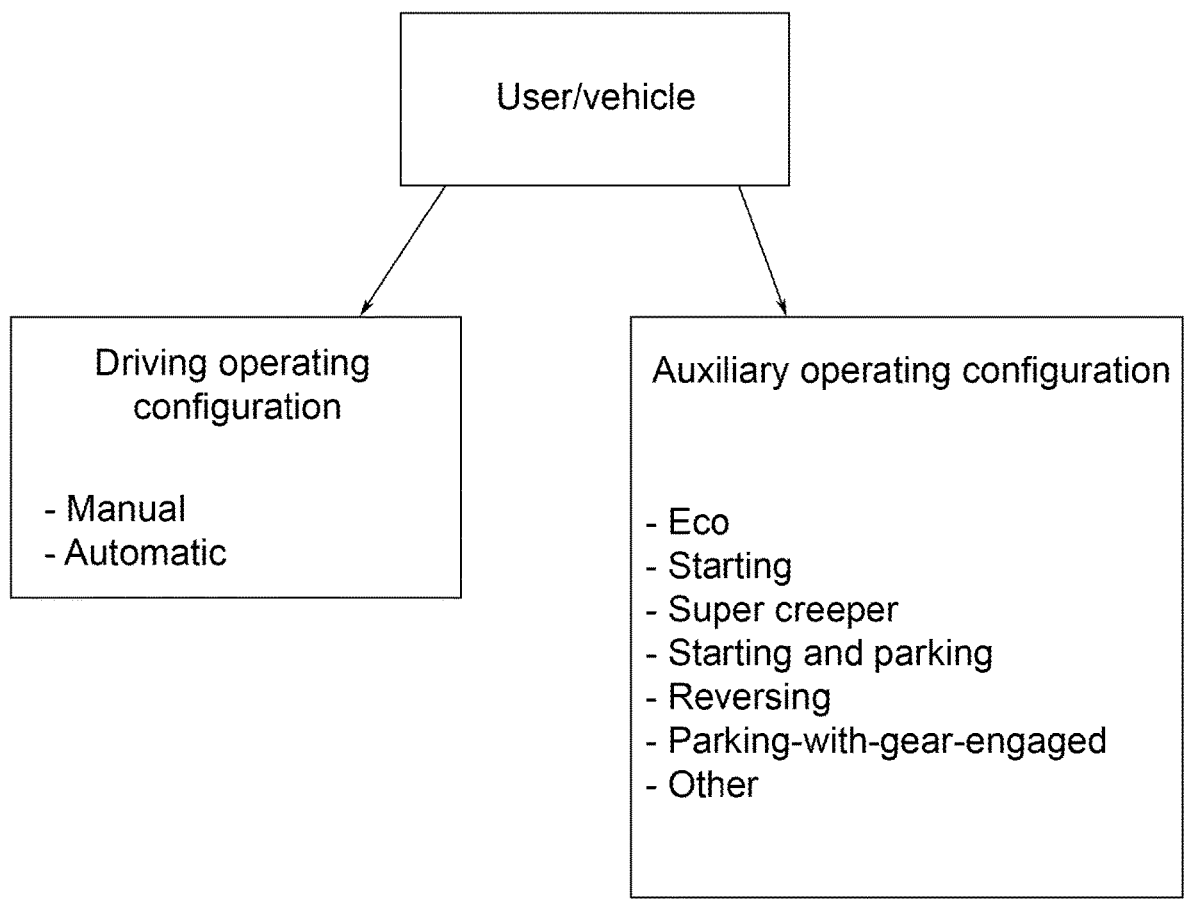
FIG. 2 shows an operational schematization of the possible working configurations of a continuously variable group according to the present invention.
Figure 3:
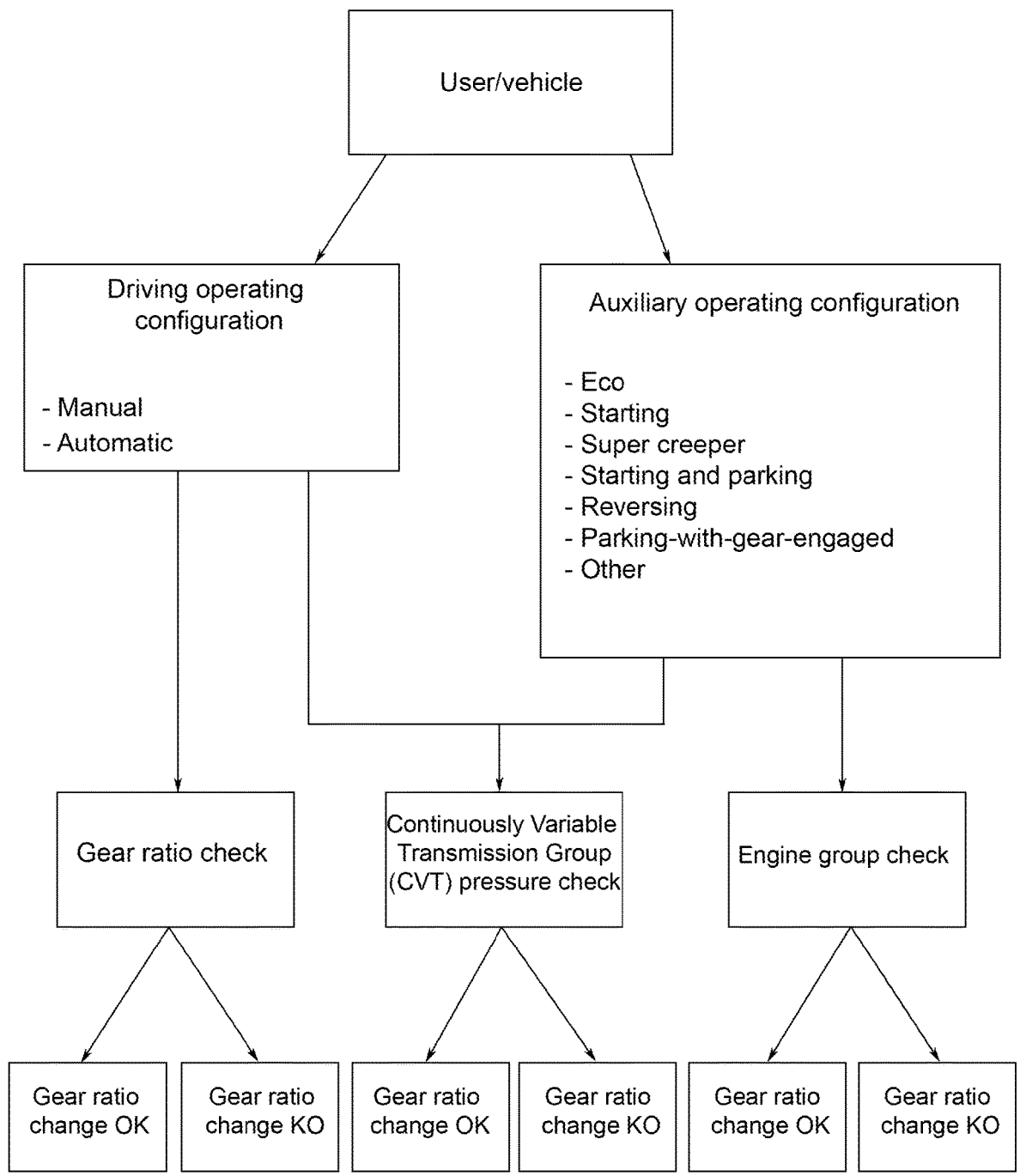
FIG. 3 shows a further operational schematization of the possible working configurations of a continuously variable group according to the present invention.

According to the attached figures, the reference number 1 has been used to indicate a vehicle for agricultural use as a whole.

According to the present invention, the vehicle for agricultural use 1 is a tractor.

According to the present invention, the vehicle for agricultural use 1 is a utility tractor.

According to the present invention, the vehicle for agricultural use 1 comprises wheel groups 2.

The number and type of said wheel groups 2 does not limit the present invention. Similarly, the type of axles or wheel group supports does not limit the present invention. Again, similarly, the type of traction, front-wheel, rear-wheel, or all-wheel, does not limit the present invention.

According to the present invention, the agricultural vehicle 1 comprises an engine group 3.

Preferably, the engine group 3 is of the internal combustion type.

Preferably, the engine group 3 is of the electrically powered type.

Preferably, the engine group 3 is of the hybrid power type.

According to the present invention, the engine group 3 is suitable for delivering an engine torque at a given number of engine revolutions.

Furthermore, according to the present invention, the agricultural vehicle 1 comprises a continuously variable transmission group 4 suitable for connecting the engine group 3 to the wheel groups 2.

The continuously variable transmission group 4 comprises a hydraulic device 40 operable to modify the gear ratio.

Preferably, the hydraulic device 40 comprises a fixed pump device commandable in a dispensing or in a resting mode (that is in on/off), or a varying pump device commandable in a preferred varying dispensing mode.

In further other words, the actuation of the hydraulic device 40 involves a variation of the gear ratio.

The agricultural vehicle 1 further comprises user management means 5 operable by the user to drive the vehicle and set the motion modes thereof.

In other words, the user management means 5 comprise all the control devices on which the user performs actions: pedals or levers or joysticks or acceleration, brake, gear change or steering change buttons; specific buttons, physical or virtualized, for example on a touchscreen interface, suitable for setting a certain operating mode.

The user management means 5 therefore comprise specific physical devices proximal to the user's driving position.

The user management means 5 are therefore operable by the user who sits in/inhabits the cockpit of the vehicle.

According to the present invention, the agricultural vehicle 1 comprises vehicle management means 6 suitable for detecting the operating conditions of the vehicle and of certain components. The vehicle management means 6 detect the speed of the vehicle, the engine revolutions delivered by the engine group 3, the gear ratio T and the hydraulic pressure value P of the continuously variable transmission group 4.

The vehicle management means 6 are also suitable for carrying out further detections in addition to those listed above.

Preferably, said vehicle management means 6 comprise specific detectors and/or specific sensors and/or specific groups of detectors and/or specific groups of sensors suitable for carrying out detections relating to the state of the vehicle and/or relating to the vehicle behavior or state of some vehicle components.

According to a preferred embodiment, the vehicle management means 6 are suitable for detecting features of the vehicle, for example its speed, its steering angles, the inclination of the vehicle.

According to a preferred embodiment, the vehicle management means 6 comprise engine status detection sensors 630 operatively connected to the engine group 3 to detect its status. In particular, the engine status detection sensors 630 detect the engine revolutions produced by the engine group 3.

According to a preferred embodiment, the vehicle management means 6 comprise hydraulic detection sensors 640 operatively connected to the hydraulic device 40 suitable for detecting a hydraulic pressure value P.

According to a preferred embodiment, the vehicle management means 6 comprise gear ratio detection sensors 645 suitable for detecting the gear ratio value T performed by the hydraulic device 40.

According to the present invention, the agricultural vehicle 1 also comprises a management and command system 7 operatively connected to the user management means 5, the vehicle management means 6, the engine group 3 and the continuously variable transmission group 4.

The management and command system 7 is suitable for receiving all the inputs coming from the user management means 5 and from the vehicle management means 6 to control the operating modes of the continuously variable transmission group 4.

Preferably, the management and command system 7 is suitable for receiving all the inputs coming from the user management means 5 and from the vehicle management means 6 to control the operating modes of the engine group 3.

According to the present invention, the management and command system 7 commands the continuously variable transmission group 4, being operatively connected to the hydraulic device 40, in:

at least one driving operating configuration, in which the hydraulic action of the hydraulic device 40 is commanded according to predetermined steps over time by carrying out a variation between one gear ratio and the other as a function of the drive commands performed by the user through the user management means 5 and/or as a function of the vehicle speed; and at least one auxiliary operating configuration, in which the hydraulic action of the hydraulic device 40 is commanded according to a continuous course over time, for example linear and/or curvilinear, by carrying out a variation of the gear ratio as a function of the engine revolutions delivered by the engine group 3.

In other words, in the driving operating configuration, through the management and command system 7, the continuously variable transmission group 4 is hydraulically commanded in a stepped mode, in which the hydraulic action is commanded in surges, that is with sudden changes over time between a minimum and a maximum, separated by said step.

Preferably, in the driving operating configuration, the management and command system 7 is influenced, in its operation, by the speed of the vehicle.

In other words, in the auxiliary operating configuration, through the management and command system 7, the continuously variable transmission group 4 is hydraulically commanded in a continuous mode, according to a linear and/or curvilinear action, that is with more or less abrupt variations as a function of engine revolutions.

According to a preferred embodiment, the driving operating configuration is settable by the user through the user management means 5 in an automatic mode, in which the variation of the gear ratio is managed and commanded autonomously by the management and command system 7 as a function of the state of the vehicle, for example of the speed and/or inclination of the vehicle, detected by the vehicle management means 6.

According to a preferred embodiment, the driving operating configuration is settable by the user through the user management means 5, in a manual mode, in which the variation of the gear ratio is a function of the interaction commanded by the user with the user management means 5.

According to a preferred embodiment, the vehicle management means 6 comprise said hydraulic detection sensors 640 operatively connected to the hydraulic device 40 and suitable for detecting a hydraulic pressure value P. In this way, in the driving operating configurations, both in automatic mode and in manual mode, the management and command system 7 checks said hydraulic pressure value P with respect to a threshold pressure value Ps, and commands the variation of the gear ratio only if the hydraulic pressure value P is less than the threshold hydraulic pressure value Ps.

According to this check, the hydraulic device 40, and in general the continuously variable transmission group 4, is always under control and the variation of the gear and/or of the gear ratio is permitted or inhibited as a function of the hydraulic state detected with respect to certain threshold values which may cause breakages and/or malfunctions.

According to a preferred embodiment, in the driving operating configurations, both in automatic mode and in manual mode, the management and command system 7 commands the variation of the gear ratio by changing the hydraulic action performed by the hydraulic device 40 as a function of the hydraulic pressure value P, thus modifying the ramp and/or the curve during the transition from one step to the other. In other words, the step to be performed through a hydraulic action corresponding to a gear change is managed in such a way that it is not so abrupt as to lead to breakages and/or malfunctions of the hydraulic system. In other words, the management and command system 7 is suitable for managing and softening said step to the correspondence of any modes such that may cause the whole to incur a risk of breakage. In other words, the management and command system 7 is suitable for managing and softening said step by performing curvilinear and/or linear passages according to a preferred inclination/curvature.

According to a preferred embodiment, the vehicle management means 6 comprise said gear ratio detection sensors 645 suitable for detecting the gear ratio value T performed by the hydraulic device 40.

In in the this way, operational driving configurations, both in automatic mode and in manual mode, the management and control system 7 checks the gear ratio value T with respect to a desired gear ratio value Ts, and checks the vehicle speed and engine revolutions with respect to a hypothetical vehicle speed value and a hypothetical engine revolutions value obtainable with the desired gear ratio Ts. Therefore, the management and control system 7 commands the variation of the gear ratio towards the desired gear ratio value Ts only if the set checks are less than predetermined threshold values.

In other words, the management and command system 7 is suitable for inhibiting or permitting the execution of the step corresponding to the gear change.

Or, in the auxiliary operating configurations, the management and command system 7 checks the gear ratio value T with respect to a desired gear ratio value Ts, and checks the vehicle speed and engine revolutions with respect to a hypothetical vehicle speed value and a hypothetical engine speed value obtainable with the desired gear ratio Ts. Therefore, the management and control system 7 commands the variation of the gear ratio towards the desired gear ratio value Ts only if the set checks are less than predetermined threshold values. In other words, the management and command system is suitable for inhibiting or permitting the execution of the continuous modification corresponding to the gear change.

According to a preferred embodiment, the auxiliary operating configuration is settable by the user through the user management means 5 in an "eco" mode, in a "super creeper" mode, in a "starting" mode, in a "starting and parking", in a "reversing" mode, or in a "parking-with-gear-engaged" mode. Preferably, in each of the aforementioned modes, the management and command system 7 commands the behavior of the engine group 3 and of the continuously variable transmission group 4 as a function of preset parameters and/or inputs detected by means of the user management means 5 and by means of the vehicle management means 6.

According to the present invention, therefore, the continuously variable transmission group 4 is commanded by the management and command system 7 substantially in two different ways, the first corresponding to the driving operating configuration in which each gear change is performed according to a step logic, each gear corresponds to a specific hydraulic action in which the user perceives a jerk, and the second corresponding to the auxiliary operating configuration in which the gear ratio change is a function of the engine revolutions and the desired action of the vehicle.

Logic step refers to a mode in which the jump between one gear ratio and the other is clear, well defined, and discrete.

Continuous transmission variation logic, on the other hand, refers to a logic in which the gear ratio takes place between substantially infinitesimal positions and steps.

According to a preferred embodiment, the management and command system 7 comprises one or more control units.

In a preferred embodiment, multiple control units are providable on a vehicle in such a way that each performs a specific check. Preferably, said control units mutually communicate and share the outputs of the specific checks performed by them.

For example, the management and command system 7 comprises a vehicle control unit 70.

For example, the management and command system 7 comprises a vehicle control unit 73 directly operatively connected to the engine group 3.

As said, the object of the present invention is also the method of managing and commanding a continuously variable transmission group 4 for an agricultural vehicle 1, wherein the following steps are carried out:
  commanding the hydraulic action of the hydraulic device 40, in at least one driving operating configuration, by operating according to predetermined steps over time by carrying out a variation between one gear ratio and the other performed by the user through the user management means 5 and/or as a function of the vehicle speed; and
  commanding the hydraulic action of the hydraulic device 40, in at least one auxiliary operating configuration, by operating according to a continuous course over time, for example linear and/or curvilinear, by carrying out a variation of the gear ratio as a function of the engine revolutions delivered by the engine group 3.

Further steps of the management and command method of a continuously variable transmission group 4 provide for the execution of the operations described above, performed by the management and command system 7 as a function of the inputs received from the user management means 5 and from the vehicle management means 6 and depending on the desired output.

For example, the step of setting, through the user management means 5, the automatic mode and/or the manual mode of the continuously variable transmission group 4 configured in the driving configuration is provided.

For example, the step of setting, through the user management means 5, the continuously variable transmission group 4 configured in the auxiliary configuration in an "eco" mode, a "super creeper" mode, a "starting" mode, a "starting and parking" mode, a "reversing" mode, or in a "parking-with-gear-engaged" mode is provided.

According to a preferred embodiment, the vehicle starting is always managed by the management and command system 7 which commands the continuously variable transmission group 4 in the "starting" auxiliary operating configuration. In other words, the user is inhibited from having a starting in which the management and command system 7 commands the continuously variable transmission group 4 in a driving operating configuration.

Furthermore, the steps for checking the pressure of the hydraulic control device 40, and/or the gear ratio performed by the hydraulic control device 40 and/or the state of the engine group 3 are provided, the output of which is therefore the one in which the variation of the gear ratio is permitted or inhibited.

Innovatively, the agricultural vehicle and the management and command method of the continuously variable transmission group of an agricultural vehicle that are the object of the present invention allow the achievement of the pre-established object, that is to make the most of a continuously variable transmission group.

Advantageously, in the driving operating configuration, the user receives the classic feelings of a mechanical gear group.

Advantageously, in the auxiliary operating configuration, the user drives the vehicle by exploiting the continuous changes over time that are typical of continuously variable gear groups.

Advantageously, the vehicle is suitable for carrying out specific checks to avoid incurring breakages or malfunctions of the continuously managed gear group.

Advantageously, the vehicle is suitable for carrying out specific checks to avoid incurring breakages or malfunctions of the engine group.

Advantageously, the vehicle is suitable for better managing any operating modes in which the presence of the user while driving is limited to the maximum, such as for example automatic driving.

Advantageously, in the operating driving configuration, the user is free to control the motion of the vehicle an extremely simplified manner, by choosing exactly the engine revolutions, the gear ratio and possibly the vehicle speed.

Advantageously, in the driving operating configuration, the management and command system is configurable upstream in such a way as to identify and set the gears and the gear ratio.

Advantageously, in the driving operating configuration, the management and command system is configurable by command by setting specific parameters. Advantageously, as desired by the user, the number and working modes of the gears are settable. Advantageously, the gears are settable in such a way as to be equidistant, but also in such a way as to be spaced out as a function of needs, for example by providing tight gears to deal with the low speeds typical of agricultural work, and wider gears to deal with situations at higher typical transport rates.

Advantageously, in the driving operating configuration, the user is free to perform multiple shifts. Advantageously, the vehicle is suitable for making multiple gear jumps without constraints potentially even of a plurality of gears, such as for example from 10 to 15.

Advantageously, in the driving operating configuration, the management and command system is suitable for managing the ramp and/or the step curve corresponding to the gear change, optimizing the torque delivered by the engine group and transmitted to the wheel groups.

Advantageously, differently from what occurs with a mechanical gear, in which the gear ratio change is obtained by the action of a clutch, and in particular by its opening, during which there is therefore no torque transmission, in the solution object of the present invention there is always torque continuity.

Advantageously, the agricultural vehicle has a high driving comfort. Advantageously, the management of the steps gives a high driving comfort in the driving operating configuration. Advantageously, the management of the auxiliary driving configurations by the management and command system involves minimal expedients by the user, thus improving his/her driving conditions and efforts: for example, minimal expedients are required on the accelerator pedal and/or brake pedal and/or joystick and the like.

Advantageously, the management of the auxiliary operating configurations is extremely simplified and optimized.

Advantageously, the agricultural vehicle manages consumption in the best possible way, optimizing and making the most of the possible configurations.

Advantageously, the vehicle for agricultural use manages consumption in the best possible way, optimizing the gear ratio and engine revolutions as a function of the tractor load and/or the state of the vehicle itself.

It is clear that a person skilled in the art, in order to meet contingent needs, may make modifications to the vehicle or to the management method, all of which are contained within the scope of protection defined by the following claims.

What is claimed:

1. An agricultural vehicle, comprising:
    wheel groups;
    an engine group adapted to deliver an engine torque at a given number of engine revolutions;
    a continuously variable transmission group adapted to connect the engine group to the wheel groups, comprising a hydraulic device operable to modify a gear ratio;
    user management means operable by a user to drive the agricultural vehicle and set motion modes thereof;
    vehicle management means adapted to detect operating conditions of the agricultural vehicle by detecting a vehicle speed, the engine revolutions, the gear ratio and a hydraulic pressure value of the continuously variable transmission group; and
    a management and command system operatively connected to the user management means, the vehicle management means, and the engine group and to the continuously variable transmission group, wherein the management and command system commands the continuously variable transmission group, the management and command system being operatively connected to the hydraulic device, in:
        at least one driving operating configuration, in which a hydraulic action of the hydraulic device is commanded according to predetermined steps over time by carrying out a variation of the gear ratio as a function of drive commands performed by the user through the user management means and/or as a function of the vehicle speed; and
        at least one auxiliary operating configuration, in which the hydraulic action of the hydraulic device is commanded according to a continuous course over time, by carrying out a variation of the gear ratio as a function of the engine revolutions delivered by the engine group,
    wherein the vehicle management means comprise hydraulic detection sensors operatively connected to the hydraulic device and adapted to detect the hydraulic pressure value so that the management and command system checks the hydraulic pressure value with respect to a threshold hydraulic pressure value, and commands the variation of the gear ratio only if the hydraulic pressure value is less than the threshold hydraulic pressure value.

2. The agricultural vehicle of claim 1, wherein the at least one driving operating configuration is settable by the user through the user management means in an automatic mode, in which the variation of the gear ratio is autonomously managed and commanded by the management and command system as a function of a state of the agricultural vehicle detected by the vehicle management means, or in a manual mode, in which the variation of the gear ratio is a function of an interaction of the user with the user management means.

3. The agricultural vehicle of claim 1, wherein the hydraulic device comprises a fixed pump device which is commandable by the management and command system in a dispensing mode or in a resting mode, or a varying pump device which is commandable by the management and command system in a preferred varying dispensing mode.

4. The agricultural vehicle of claim 1, wherein the management and command system commands the variation of the gear ratio by changing the hydraulic action performed by the hydraulic device as a function of the hydraulic pressure value, thus modifying a curve and/or a ramp during transition from one step to the other.

5. The agricultural vehicle of claim 1, wherein the vehicle management means comprise gear ratio detection sensors adapted to detect a gear ratio value performed by the hydraulic device, wherein the management and command system checks the gear ratio value with respect to a desired gear ratio value and checks the vehicle speed and the engine revolutions, respectively, with respect to a hypothetical vehicle speed value and a hypothetical engine revolutions value which are obtainable with the desired gear ratio value, and wherein the management and command system commands the variation of the gear ratio towards the desired gear ratio value only if the checks are less than predetermined threshold values.

6. The agricultural vehicle of claim 1, wherein the vehicle management means comprise gear ratio detection sensors adapted to detect a gear ratio value performed by the hydraulic device, wherein in the at least one auxiliary operating configuration, the management and command system checks the gear ratio value with respect to a desired gear ratio value and checks the vehicle speed and the engine revolutions, respectively, with respect to a hypothetical vehicle speed value and a hypothetical engine revolutions value which are obtainable with the desired gear ratio value, and wherein the management and command system commands the variation of the gear ratio and the engine revolutions only if the checks performed on the engine revolutions are less than a predetermined threshold value.

7. The agricultural vehicle of claim 1, wherein the at least one auxiliary operating configuration is settable by the user through the user management means in an "eco" mode, a "super creeper" mode, in a "starting" mode, in a "starting and parking" mode, in a "reversing" mode, or in a "parking-with-gear-engaged" mode, and wherein the management and command system in each of the modes commands a behavior of the engine group and the continuously variable transmission group as a function of preset parameters.

8. The agricultural vehicle of claim 1, wherein the agricultural vehicle is a tractor.

9. The agricultural vehicle of claim 1, wherein the continuous course over time is linear and/or curvilinear.

10. The agricultural vehicle of claim 2, wherein the state of the agricultural vehicle is a state of motion.

11. A method of managing and commanding a continuously variable transmission group of an agricultural vehicle comprising:
  wheel groups;
  an engine group adapted to deliver an engine torque at a given number of engine revolutions;
  a continuously variable transmission group adapted to connect the engine group to the wheel groups, comprising a hydraulic device operable to modify a gear ratio;
  user management means operable by a user to drive the agricultural vehicle and set motion modes thereof;
  vehicle management means adapted to detect operating conditions of the agricultural vehicle by detecting a vehicle speed, the engine revolutions, the gear ratio and a hydraulic pressure value of the continuously variable transmission group; and
  a management and command system operatively connected to the user management means, the vehicle management means, the engine group and to the continuously variable transmission group, wherein the management and command system commands the continuously variable transmission group, the management and command system being operatively connected to the hydraulic device, in:
    at least one driving operating configuration, in which a hydraulic action of the hydraulic device is commanded according to predetermined steps over time, by carrying out a variation of the gear ratio as a function of drive commands performed by the user through the user management means and/or as a function of the vehicle speed; and
    at least one auxiliary operating configuration, in which the hydraulic action of the hydraulic device is commanded according to a continuous course over time by carrying out a variation of the gear ratio as a function of the engine revolutions delivered by the engine group,
  wherein the vehicle management means comprise hydraulic detection sensors operatively connected to the hydraulic device and adapted to detect the hydraulic pressure value so that the management and command system checks the hydraulic pressure value with respect to a threshold hydraulic pressure value, and commands the variation of the gear ratio only if the hydraulic pressure value is less than the threshold hydraulic pressure value,
  the method comprising:
    commanding the hydraulic action of the hydraulic device, in the at least one driving operating configuration, by operating according to predetermined steps over time by carrying out the variation of the gear ratio as the function of the drive commands performed by the user through the user management means and/or as the function of the vehicle speed; and
    commanding the hydraulic action of the hydraulic device, in the at least one driving operating configuration, by operating according to predetermined steps over time by carrying out the variation of the gear ratio as the function of the drive commands performed by the user through the user management means and/or as the function of the vehicle speed; and commanding the hydraulic action of the hydraulic device, in the at least one auxiliary operating configuration, by operating according to a continuous course over time, by carrying out the variation of the gear ratio as the function of the engine revolutions delivered by the engine group.

12. The method of claim 11, wherein the continuous course over time is linear and/or curvilinear.

13. An agricultural vehicle, comprising:
wheel groups;
an engine group adapted to deliver an engine torque at a given number of engine revolutions;
a continuously variable transmission group adapted to connect the engine group to the wheel groups, comprising a hydraulic device operable to modify a gear ratio;
user management means operable by a user to drive the agricultural vehicle and set motion modes thereof;
vehicle management means adapted to detect operating conditions of the agricultural vehicle by detecting a vehicle speed, the engine revolutions, the gear ratio and a hydraulic pressure value of the continuously variable transmission group; and
a management and command system operatively connected to the user management means, the vehicle management means, and the engine group and to the continuously variable transmission group, wherein the management and command system commands the continuously variable transmission group, the management and command system being operatively connected to the hydraulic device, in:
at least one driving operating configuration, in which a hydraulic action of the hydraulic device is commanded according to predetermined steps over time by carrying out a variation of the gear ratio as a function of drive commands performed by the user through the user management means and/or as a function of the vehicle speed; and
at least one auxiliary operating configuration, in which the hydraulic action of the hydraulic device is commanded according to a continuous course over time, by carrying out a variation of the gear ratio as a function of the engine revolutions delivered by the engine group,
wherein the vehicle management means comprise gear ratio detection sensors adapted to detect a gear ratio value performed by the hydraulic device, wherein in the at least one auxiliary operating configuration, the management and command system checks the gear ratio value with respect to a desired gear ratio value and checks the vehicle speed and the engine revolutions, respectively, with respect to a hypothetical vehicle speed value and a hypothetical engine revolutions value which are obtainable with the desired gear ratio value, and wherein the management and command system commands the variation of the gear ratio and the engine revolutions only if the checks performed on the engine revolutions are less than a predetermined threshold value.

* * * * *